United States Patent
Smith

(10) Patent No.: US 11,194,573 B1
(45) Date of Patent: Dec. 7, 2021

(54) STREAMING EXECUTION FOR A QUANTUM PROCESSING SYSTEM

(71) Applicant: Rigetti & Co, Inc., Berkeley, CA (US)

(72) Inventor: Robert Stanley Smith, Emeryville, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 311 days.

(21) Appl. No.: 16/271,661

(22) Filed: Feb. 8, 2019

Related U.S. Application Data

(60) Provisional application No. 62/628,836, filed on Feb. 9, 2018.

(51) Int. Cl.
   G06F 9/30         (2018.01)
   G06F 9/38         (2018.01)
   (Continued)

(52) U.S. Cl.
   CPC .......... G06F 9/30003 (2013.01); G06F 8/41 (2013.01); G06F 9/3804 (2013.01); G06N 10/00 (2019.01)

(58) Field of Classification Search
   None
   See application file for complete search history.

(56) References Cited

U.S. PATENT DOCUMENTS 7,533,068 B2 *  5/2009  Maassen van den Brink ............. G06F 15/76 706/10
7,624,088 B2 * 11/2009  Johnson .................. G06N 10/00 706/62

(Continued)

FOREIGN PATENT DOCUMENTS

AU    2008248422 A1 * 11/2008 ............. H04L 47/50
CN      107077642 A  *  8/2017 ............... G06F 9/02
(Continued)

OTHER PUBLICATIONS

'Quantum Memory Hierarchies: Efficient Designs to Match Available Parallelism in Quantum Computing' by Darshan D. Thaker et al., 33rd Annual International Symposium on Computer Architecture, ISCA 2006. (Year: 2006).*
(Continued)

Primary Examiner — Steven G Snyder
(74) Attorney, Agent, or Firm — Fenwick & West LLP

(57) ABSTRACT

Interactions between a classical computing system and a quantum computing system can be structured to increase the effective memory available to hold instructions for a quantum processor. The system stores a schedule of compiled quantum processing instructions in a memory storage location on a classical computing system. A small program memory is included in close proximity to a control system for the quantum processor on the quantum computing system. The classical computing system sends a subset of instructions from the schedule of quantum instructions to the program memory. The control system manages execution of the instructions by accessing them at the program memory and configuring the quantum processor accordingly. While the quantum processor executes the instructions, additional instructions are transferred from the classical computing system to the program memory to await execution. The quantum system can execute many instructions quickly without idling while instructions are fetched from a large memory.

21 Claims, 5 Drawing Sheets

(51) Int. Cl.
    *G06N 10/00*       (2019.01)
    *G06F 8/41*        (2018.01)

(56) References Cited

U.S. PATENT DOCUMENTS

| | | | |
|---|---|---|---|
| 8,008,942 B2 * | 8/2011 | van den Brink | G06F 15/80 326/4 |
| 8,195,726 B2 * | 6/2012 | Macready | B82Y 10/00 708/1 |
| 8,283,943 B2 * | 10/2012 | van den Brink | H04L 67/12 326/4 |
| 8,655,828 B2 * | 2/2014 | Rose | G06K 9/6892 706/48 |
| 8,686,751 B2 * | 4/2014 | van den Brink | G06N 5/003 326/4 |
| 8,874,629 B2 * | 10/2014 | Macready | G06N 10/00 708/1 |
| 9,069,928 B2 * | 6/2015 | van den Brink | G06N 10/00 |
| 9,537,953 B1 * | 1/2017 | Dadashikelayeh | G06F 16/951 |
| 9,727,527 B2 * | 8/2017 | Maassen van den Brink | G06F 15/76 |
| 10,127,499 B1 * | 11/2018 | Rigetti | G06F 15/16 |
| 10,140,248 B2 * | 11/2018 | Maassen van den Brink | G06F 15/76 |
| 10,176,433 B2 * | 1/2019 | Hastings | G06N 20/00 |
| 10,346,349 B2 * | 7/2019 | Maassen van den Brink | G06N 5/003 |
| 10,402,743 B1 * | 9/2019 | Rigetti | G06F 9/30043 |
| 10,437,991 B2 * | 10/2019 | Castinado | G06N 10/00 |
| 10,592,216 B1 * | 3/2020 | Richardson | G06F 8/60 |
| 10,614,370 B2 * | 4/2020 | Johnson | G06N 10/00 |
| 10,691,633 B2 * | 6/2020 | Maassen van den Brink | G06F 15/76 |
| 10,769,545 B2 * | 9/2020 | Amin | G06N 10/00 |
| 10,922,166 B2 * | 2/2021 | Hogaboam | G06N 10/00 |
| 10,956,830 B1 * | 3/2021 | Rigetti | G06F 15/16 |
| 2003/0169041 A1 * | 9/2003 | Coury | B82Y 10/00 324/307 |
| 2006/0225165 A1 * | 10/2006 | Maassen van den Brink | G06F 15/80 257/9 |
| 2007/0174227 A1 * | 7/2007 | Johnson | B82Y 10/00 706/62 |
| 2007/0239366 A1 * | 10/2007 | Hilton | B82Y 10/00 702/27 |
| 2008/0109500 A1 * | 5/2008 | Macready | B82Y 10/00 708/2 |
| 2008/0313430 A1 * | 12/2008 | Bunyk | B82Y 10/00 712/34 |
| 2009/0167342 A1 * | 7/2009 | van den Brink | G06F 15/80 326/4 |
| 2011/0298489 A1 * | 12/2011 | van den Brink | G06F 15/80 326/4 |
| 2012/0045136 A1 * | 2/2012 | Rose | G06K 9/00973 382/209 |
| 2012/0179924 A1 * | 7/2012 | Sugiyama | G06F 1/32 713/320 |
| 2012/0215821 A1 * | 8/2012 | Macready | B82Y 10/00 708/1 |
| 2013/0007087 A1 * | 1/2013 | van den Brink | H03K 3/38 708/800 |
| 2014/0229705 A1 * | 8/2014 | van den Brink | H04L 67/12 712/30 |
| 2015/0332164 A1 * | 11/2015 | Maassen van den Brink | G06N 5/003 709/217 |
| 2015/0363708 A1 * | 12/2015 | Amin | G06N 10/00 712/42 |
| 2017/0223094 A1 * | 8/2017 | Johnson | G06N 10/00 |
| 2017/0300454 A1 * | 10/2017 | Maassen van den Brink | G06N 10/00 |
| 2017/0330101 A1 * | 11/2017 | Hastings | G06N 99/007 |
| 2018/0260245 A1 * | 9/2018 | Smith | G06F 9/4881 |
| 2018/0365585 A1 * | 12/2018 | Smith | G06F 9/546 |
| 2019/0042264 A1 * | 2/2019 | Zou | G06F 9/3818 |
| 2019/0042970 A1 * | 2/2019 | Zou | G06F 15/16 |
| 2019/0042971 A1 * | 2/2019 | Zou | G06N 10/00 |
| 2019/0042972 A1 * | 2/2019 | Zou | G06F 15/16 |
| 2019/0042973 A1 * | 2/2019 | Zou | G06F 9/30007 |
| 2019/0087385 A1 * | 3/2019 | Maassen van den Brink | G06F 15/80 |
| 2019/0324941 A1 * | 10/2019 | Maassen van den Brink | G06N 5/003 |
| 2019/0392341 A1 * | 12/2019 | Leipold | G06F 15/16 |
| 2019/0392342 A1 * | 12/2019 | Leipold | G06N 5/003 |
| 2020/0160205 A1 * | 5/2020 | Leipold | G06F 15/7807 |
| 2020/0201379 A1 * | 6/2020 | Hogaboam | G06F 1/08 |
| 2020/0218518 A1 * | 7/2020 | Gambetta | G06N 10/00 |
| 2020/0242208 A1 * | 7/2020 | Daraeizadeh | G06F 30/30 |
| 2020/0293486 A1 * | 9/2020 | Maassen van den Brink | G06F 15/76 |
| 2020/0310908 A1 * | 10/2020 | Hogaboam | G06N 10/00 |
| 2020/0320437 A1 * | 10/2020 | Gambetta | G06N 10/00 |
| 2020/0334563 A1 * | 10/2020 | Gambetta | G06N 10/00 |
| 2020/0394544 A1 * | 12/2020 | Low | B82Y 10/00 |
| 2020/0401427 A1 * | 12/2020 | Gambetta | G06F 9/455 |
| 2021/0067176 A1 * | 3/2021 | Leipold | H01L 39/221 |
| 2021/0133881 A1 * | 5/2021 | Egger | G06N 10/00 |
| 2021/0173660 A1 * | 6/2021 | Hogaboam | G06F 9/3851 |
| 2021/0216897 A1 * | 7/2021 | Woerner | G06F 17/11 |
| 2021/0216898 A1 * | 7/2021 | Huffman | G06F 11/32 |

FOREIGN PATENT DOCUMENTS

| | | | | |
|---|---|---|---|---|
| CN | 110569979 A | * | 12/2019 | |
| CN | 111108604 A | * | 5/2020 | H01L 29/401 |
| EP | 3716161 A1 | * | 9/2020 | G06F 11/10 |
| JP | 5072603 B2 | * | 11/2012 | G06F 15/80 |
| WO | WO-2015178992 A2 | * | 11/2015 | G06N 10/00 |

OTHER PUBLICATIONS

'Taming the Instruction Bandwidth of Quantum Computers via Hardware-Managed Error Correction' by Swamit S. Tannu et al., copyright 2017, ACM. (Year: 2017).*

'Quantum Processor Hooks Up with Quantum Memory' by Tom Simonite, Sep. 1, 2011. (Year: 2011).*

'ScaffCC: Scalable Compilation and Analysis of Quantum Programs' by Ali JavadiAbhari et al., Jul. 7, 2015. (Year: 2015).*

'Scheduling Physical Operations in a Quantum Information Processor' by Tzvetan S. Metodi et al., May 12, 2006. (Year: 2006).*

'EQASM: An Executable Quantum Instruction Set Architecture' by X. Fu et al., In Proceedings of the 25th International Symposium on High-Performance Computer Architecture (HPCA'19), 2019. (Year: 2019).*

'Efficient Emulation of Quantum Circuits on Classical Hardware' by Calebe Conceicao et al., copyright 2005, IEEE. (Year: 2005).*

'Understanding Quantum Control Processor Capabilities and Limitations through Circuit Characterization' by Anastasiia Butko et al., Dec. 4, 2020. (Year: 2020).*

Smith, R. S. et al., "A Practical Quantum Instruction Set Architecture," Rigetti & Co., Inc.—v2.0.20170217, Feb. 17, 2017, pp. 1-15.

* cited by examiner

STREAMING EXECUTION FOR A QUANTUM PROCESSING SYSTEM

CROSS REFERENCE TO RELATED APPLICATIONS

This application claims the benefit of Provisional Application No. 62/628,836, filed Feb. 9, 2018, which is incorporated by reference in its entirety.

BACKGROUND OF THE INVENTION

1. Field of the Invention

This invention relates generally to quantum computing, and in particular to streaming instructions to a quantum processor.

2. Description of the Related Art

At a high level, classical computer systems with stored program architectures execute a program by first loading the program into memory, performing linkage, and then executing the program by modifying the program counter of the computer's central processing unit (CPU). In general, classical computer systems have enough random access memory (RAM) to accommodate instructions for a computer program. The classical computing systems also use a single program counter to step through a sequence of instructions that has been loaded into RAM. Thus, a scheme of repeatedly fetching an instruction from memory, executing the instruction, and updating the program counter facilitates the execution of a whole program.

Quantum computing systems have different ideal operating conditions from classical computing systems. Quantum systems can execute multiple instructions simultaneously. In some cases, it is even necessary that certain instructions execute simultaneously on a quantum processor because of physical requirements of the system. For a processor that can execute multiple instructions at once, fetching and executing one instruction at a time, as classical computing systems do, results in low performance. Additionally, quantum computing systems often only support a small number of instructions, which leads to a requirement of larger quantum programs in general. As a result, a quantum program may require more memory space than a classical computer program because a quantum system can execute many more instructions than a classical system in the same amount of time.

However, quantum systems are also limited by coherence times of quantum bits (qubits), which can have short windows of usability for computations. To execute an instruction while a qubit is still viable for computation, the instruction must be fetched very quickly. Quick fetches tend to rely on small memories that are physically proximal to a processing unit. In such embodiments, quantum programs, which can be very large, cannot be accessed quickly enough to perform optimally.

SUMMARY

A system and method of accessing and executing quantum program instructions allows quantum instruction code to be streamed from a classical processing system to a quantum processor while quantum instruction code is executing. A small program memory is included in close proximity to a control system for the quantum processing unit. Quantum program instructions are stored in a large memory space on a classical computer system. Scheduled quantum instructions are loaded from the memory on the classical system into the program memory on the quantum system as space becomes available in the program memory. At the same time, the quantum processor fetches sets of scheduled instructions from the program memory and executes the instructions.

The configuration lowers burdens on hardware requirements for a quantum system. In particular, since a classical computing system manages storage and streaming of the quantum instructions, the memory requirements of the quantum computing system are reduced. Furthermore, the system described herein enables just-in-time compilation schemes for a quantum processing system, as the quantum instructions do not need to be compiled until just before they are streamed to the program memory.

Figure 1:
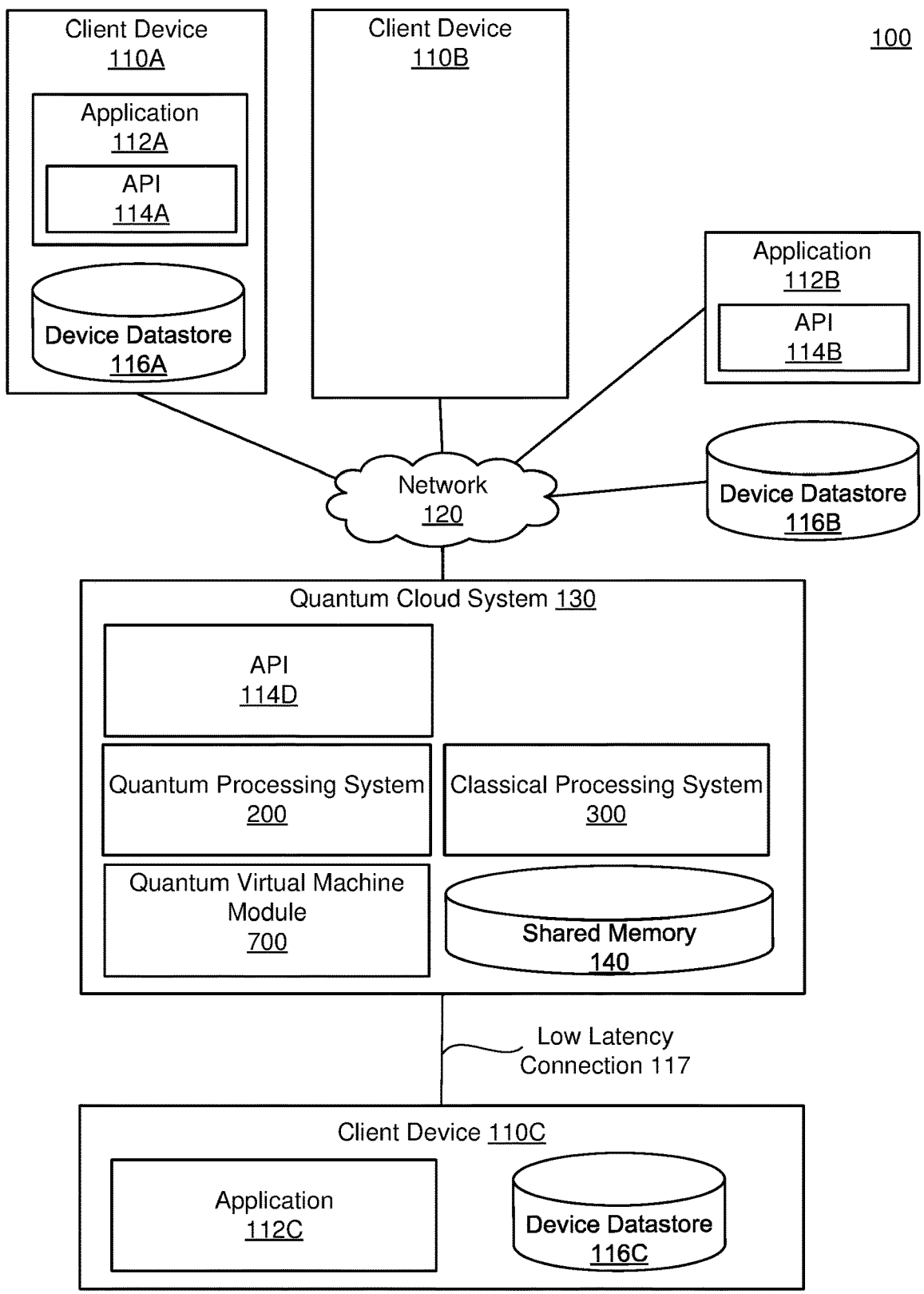
FIG. 1 is an illustration of a system environment for a quantum computation system, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Quantum computations are fundamentally different from classical computations. Real world computing applications rarely use solely quantum computations and are generally a hybridization of quantum and classical computations. However, executing quantum computations requires a highly specific set of hardware and integrating the results of those quantum computations with classical systems is challenging. Described herein is a cloud quantum computing system that allows for the integration of quantum computations by classical processing systems.

Quantum algorithms, when executed, manipulate and read information stored in a quantum bit (i.e. qubit). A qubit is fundamentally different than a classical bit. A classical bit has two possible states, typically represented as a 0 or a 1. Ostensibly, a qubit also has two measurable outcomes which can likewise be represented as a 0 or a 1. However, more precisely, the state of a qubit is a superposition of the two measurable outcomes, i.e. some probability of a 0 state and some probability of a 1 state. Hence, a qubit can encode more information in its state than a classical bit.

The two measurable outcomes of a qubit are known as the basis states. The basis states can be written as $|0\rangle$ and $|1\rangle$. Accordingly, a qubit state is a linear superposition of the basis states. Thus, a qubit state $|\psi\rangle$ can be represented as a linear combination of $|0\rangle$ and $|1\rangle$: $|\psi\rangle = \alpha|0\rangle + \beta|1\rangle$, where $\alpha$ and $\beta$ are complex-valued probability amplitudes of the basis states. Measurement of a qubit state is a measurement of the basis states $|0\rangle$ and $|1\rangle$ with probabilities $|\alpha|^2$ and $|\beta|^2$, respectively. Generally, direct measurement of the qubit alters the values of $\alpha$ and $\beta$.

Another dissimilarity between a qubit and a classical bit is that multiple qubits can demonstrate quantum entanglement. Quantum entanglement allows a qubit state to express correlation between a set of qubit states that is more difficult or not possible between classical bits. As an example, the qubit state of two entangled qubits can be expressed as $|\psi\rangle = \gamma_{00}|00\rangle + \gamma_{01}|01\rangle + \gamma_{10}|10\rangle + \gamma_{11}|11\rangle$ where the $\gamma$ values are the probability amplitudes of the entangled states. Thus, multiple qubits can store more information in their states than the equivalent number of classical bits.

Generally, quantum algorithms are executed on a quantum computation system to encode information into a qubit (or group of qubits) state, manipulate the qubit state, and measure the qubit state.

When a program is executed on a classical computer, instructions for the program are loaded into memory (e.g., random access memory (RAM)) and a processor subsequently executes the instructions stored in the memory to run the program. In a classical computing system, this type of program execution may typically be achieved with one program counter that keeps track of a memory address holding the next instruction for a central processing unit (CPU) to execute. Thus, to execute a program, a classical computing system fetches a next instruction, executes the instruction, and so on, until it reaches the end of the program.

Unlike a classical computer processor, a quantum processor can execute multiple instructions simultaneously. In some cases, it may even be necessary for multiple quantum instructions to execute at the same time due to the architecture and physical requirements of the quantum processor, for example, when qubits demonstrate quantum entanglement. Instead of an instruction sequence, as may be executed by a classical computer processor, a quantum processor is given an instruction schedule that designates sets of instructions to be executed by the quantum processor simultaneously at specified time steps.

For such a system to be practical, latency of instruction transfers should be minimized as much as possible. Thus, the memory holding the instructions should be physically close to a quantum processor. It is important to reduce the latency of instruction fetches because of the physical limitations of the quantum processing system. The coherence time of an example qubit can be within the range of 1-50 μs. Reduced latency can help ensure that the program instructions can reach the quantum processor for execution while the qubits are still viable.

Execution of quantum algorithms via a quantum computation system requires a complex set of computational hardware that is typically not directly accessible to the general public or even to those with the expertise to make use of such systems. However, the described computing environment allows for the remote control and execution of quantum algorithms using a network-based quantum computation system. As an example, FIG. 1 is an illustration of a system environment 100 for a quantum computation system, such as a quantum cloud system 130, which can provide the results of quantum computations to client devices remote from the quantum cloud system 130. The system environment 100 of FIG. 1 includes client devices 110, a network 120, and a quantum cloud system 130. Alternate embodiments of the system environment can include any number of client devices 110 and quantum cloud systems 130. The functions performed by the various entities of FIG. 1 may vary in different embodiments.

Within the context of the environment 100 of FIG. 1, a user of a client device 110 generates a set of quantum calculation instructions using an application 112 executing on the client device 110, or using an application 112 executing on a separate machine that is accessed by the client device 110. In some embodiments, the quantum calculation instructions can be written in a defined quantum instruction language (e.g., the Quil programming language) as a quantum algorithm. A quantum algorithm can include any computer executable representation of quantum instructions, a series of quantum computations, hardware commands, software commands, or control signals.

The implementation or execution of the quantum algorithm by the quantum cloud system 130 includes the determination of at least one result of a quantum operation (e.g., reading a qubit or multiple qubits). The client device 110 transmits the quantum algorithm to the quantum cloud system 130. The quantum cloud system 130 receives the quantum algorithm, schedules instructions of the quantum algorithm on the quantum cloud system 130, and executes the quantum algorithm on the quantum cloud system 130. The quantum cloud system 130 determines the result of the quantum algorithm by executing the quantum algorithm using the classical processing system 300, the quantum processing system 200, or the quantum virtual machine module 700 (or any combination of the systems). Accordingly, the quantum cloud system 130 transmits the determined result of the quantum algorithm to the client device 110.

This hybridization of classical processing and quantum processing allows for direct integration of quantum computations and classical computations into a familiar classical computer program framework. Executing quantum calculations on a classical system, and classical calculations on a quantum system, is non-ideal. Thus, the hybrid quantum cloud system allows for leveraging the performance advantages of quantum and classical computations into a single system.

Further, the quantum cloud system 130 can receive any number of quantum algorithms from any number of client devices 110 in the environment. Additionally, the quantum cloud system 130 includes functionality to execute quantum algorithms received from disparate client devices 110 such that the quantum algorithms are executed efficiently.

In the environment of FIG. 1, client devices 110 are classical computing devices adapted to execute classical computer programs. In one embodiment, client devices 110A include software applications, such as application 112A, which execute on the processor of the respective client device 110A. In one example, the application 112 can be a programming application, such as a compiler and/or integrated development environment, configured to program quantum processing systems. That is, the application 112 can generate a quantum algorithm for determining the result of a quantum calculation on the quantum cloud system 130. Thus, the client devices 110 generate a quantum algorithm that uses quantum calculations in the context of a classical application. Other examples of applications 112 can be a web browser, a word processor, a networking application, a messaging application, etc. Additionally, the client applications 112 can communicate with one another and with quantum cloud system 130 via the network 120. In some embodiments, each application 112 can be linked to a user account on the quantum cloud system 130 associated with a client device 110, the client device user, or a group of client device users. In some embodiments, the client devices 110 execute a client application 112 that uses an application programming interface (API) 114 to communicate with the quantum cloud system 130 through the network 120. In other embodiments the API 114 may be on the quantum cloud system 130—see API 114D. In some examples, the API 114 is configured to allow the application 112 to generate quantum algorithms that control both the classical processing system 300 and quantum processing system 200. In one embodiment, as depicted in FIG. 1 by client device 110B, the application 112B may not be stored locally by the client device 110B. The application 112B may be stored on the cloud or another remote server. For example, the client device 110B may access the application 112B via the network 120. In another embodiment, the client device 110C, which may include application 112C, may be on a server that is in close proximity to the quantum processing system 200, where the client device 110C is connected to the quantum cloud system 130 by a low latency connection 117. It should be noted that although the connection 117 is low-latency in the embodiment of FIG. 1, in practice, the connection may be any latency.

Additionally, the client device includes a device datastore 116. The device datastore 116 contains information associated with the device user, the client device 110, a user account, client applications and application specific data, such as data and variables used by or related to the quantum algorithms. This information can be accessed by the application 112 when generating or transmitting a quantum algorithm to the quantum cloud system 130. In one embodiment, the information can be used to build, store, modify, or update user profiles. The information stored in the device data store can include: inter-device security metrics, intra-device security metrics, network security metrics, authentication protocols, user account information and preferences, client device information and preferences, device user information and preferences, a record of preferences and changes, location based information, identities of applications or other application information executing on the client device, and any other information associated with executing quantum algorithms in the environment. As with the application 112, the device datastore 116A may be stored locally on a client device 110A or the device datastore 116B may be stored on the cloud or another remote server. For example, the client device 110B may access the device datastore 116B via the network 120. In another embodiment, the client device 110C, which may include device datastore 116C, may be on a server that is in close proximity to the quantum processing system 200, where the client device 110C may be connected to the quantum cloud system 130 by a low latency connection 117.

Continuing with FIG. 1, the client devices 110 communicate with the quantum cloud system 130 via the network 120, which may include any combination of local area and wide area networks employing wired or wireless communication links. In some embodiments, all or some of the communication on the network 120 may be encrypted or subject to security settings within the environment. In example embodiments, the quantum cloud system 130 is located remotely from a client device 110. In such embodiments, the client device 110 can communicate with and leverage the capabilities of the quantum cloud system 130 via the Internet.

The quantum cloud system 130 receives, interprets, and executes the quantum algorithm from a client device 110. In some examples, a user generates the quantum algorithm on a client device 110 and transmits the quantum algorithm to the quantum cloud system 130. As will be further described below, transmitting a quantum algorithm includes transmitting a set of executable quantum instructions. After execution, the quantum cloud system 130 transmits the result of the quantum algorithm to the client device 110. In the example embodiment of FIG. 1, the quantum cloud system 130 includes a quantum processing system 200, a classical processing system 300, a quantum virtual machine module (QVM) 700, and a shared memory 140.

The quantum cloud system 130 includes a number of systems and modules, which refers to hardware components and/or computational logic for providing the specified functionality. That is, a system or module can be implemented in hardware elements, firmware, and/or software (e.g., a hardware server comprising computational logic, or computer storage medium comprising computational logic). Other embodiments can include additional systems and modules, can distribute functionality between systems and modules, and can attribute functionality to more or fewer systems or modules. Note that the quantum processing systems and modules may require quantum hardware systems. Further, some modules of the quantum cloud system 130 are designed for control of the quantum hardware systems.

The quantum cloud system 130 includes a classical processing system 300. The classical processing system 300 is described in more detail in regards to FIG. 3. The classical processing system 300 receives a quantum algorithm from a client device and generates a set of algorithm instructions to determine the result of the quantum algorithm. The quantum cloud system 130 executes the algorithm instructions to determine the result of the quantum algorithm and returns the result of the quantum algorithm to the client device 110. In one embodiment, the classical processing system 300 determines the set of algorithm instructions based on the quantum instruction language of the received quantum algorithm.

Because the quantum algorithm is executing on quantum cloud system 130, which includes both classical and quantum systems, the set of algorithm instructions can likewise include both classical instructions and quantum instructions (referred to as a "hybrid classical/quantum algorithm"). The classical instructions are instructions of the algorithm that execute on the classical processing system 300. Similarly, the quantum instructions are instructions of the algorithm that execute on the quantum processing system 200.

The classical processing system 300 can schedule the algorithm instructions on elements of the quantum cloud system 130. Scheduling the algorithm instructions defines an order of execution for the algorithm instructions across the elements of the quantum cloud system 130. Generally, the algorithm instructions are scheduled such that the classical instructions and quantum instructions operate on their respective systems in a manner that efficiently determines the result of the quantum algorithm on the quantum cloud system 130.

Algorithm instructions can be scheduled by the quantum cloud system 130 in a variety of manners. As a basic example, the classical processing system 300 may schedule two classical instructions on the classical processing system 300 and a single quantum instruction on the quantum processing system 200, followed by three classical instructions on the classical processing system 300, etc. In another example, the quantum instructions can be scheduled and executed on the quantum virtual machine module 700, for instance when the quantum instructions can be efficiently executed by a classical computing system emulating a quantum computing system, thereby saving processing cycles by the quantum processing system 200. In another embodiment, the classical processing system 300 directly schedules the quantum instructions on the quantum processing system 200. In another embodiment, executing a classical instruction initiates the scheduling and execution of a quantum instruction on the quantum processing system 200.

The scheduled algorithm instructions can be executed by the quantum cloud system 130 in a variety of manners. Using the previous example, the quantum cloud system 130 may execute the two classical instructions, then the quantum instruction, then the three classical instructions, etc. In some embodiments, the algorithm instructions are executed based on a system clock of the quantum cloud system 130 (e.g., each instruction executes at a specific time). In another embodiment, the algorithm instructions execute sequentially (e.g., a first instruction, a second instruction, etc.). In another embodiment, the classical processing system 300 can schedule classical and quantum operations to execute simultaneously on their respective systems.

Whatever the embodiment, the classical processing system 300 may schedule algorithm instructions in any manner across any of the systems and modules of the quantum cloud system 130 such that, when executed, the algorithm instructions determine the result of the quantum algorithm.

Referring again to FIG. 1, the quantum cloud system 130 includes a quantum processing system 200. The quantum processing system 200 is described in more detail in regards to FIG. 2. The quantum processing system 200 is configured to execute quantum operations to facilitate the determination of a result of a quantum algorithm. For example, the quantum processing system 200 receives scheduled quantum instructions from the classical processing system 300 and executes the quantum instructions. In another example, the quantum processing system 200 receives and executes a quantum instruction as a result of the classical processing system 300 executing a classical instruction. Generally, the quantum processing system 200 stores the result of the quantum computation in the shared memory 140. In some embodiments, the quantum processing system 200 returns the result of the quantum computation to the classical processing system 300.

The shared memory 140 stores information that can be used by any system or module of the quantum cloud system 130 to facilitate determining the result of a quantum algorithm (e.g., the quantum processing system 200 and the classical processing system 400). In a particular example, the shared memory 140 stores the result of executed quantum computations by the quantum processing system 200, which are then directly accessible by the classical processing system 300. As noted above, the algorithm instructions can include information stored in the shared memory 140 of the quantum cloud system 130. For example, the shared memory 140 can store a rotation angle as an input parameter that a quantum instruction can access and apply to a qubit when executing. As another example, the shared memory 140 can store the results of two previously executed quantum operations which a classical instruction can multiply using the classical processing system 300.

In some embodiments, the quantum cloud system 130 includes a quantum virtual machine module 700. The quantum virtual machine module 700 is a classical system configured to simulate quantum calculations (such as those performed by the quantum processing system 200). That is, the quantum virtual machine module 700 simulates quantum instructions on traditional computer architectures to simulate quantum operations and results. As such, the quantum virtual machine module 700 can receive quantum instructions from the classical processing system 300. The quantum virtual machine module 700 executes the quantum instructions and returns the result to the classical processing system 300.

For a contextual example of the environment 100, consider a researcher working to understand the dynamics of protein folding in a biological environment. The researcher generates computer code modeling protein folding using a hybrid classical/quantum algorithm including several classical and quantum calculations. The code is generated on a client device 110 using an application 112 with an installed API 114 configured to generate code using a quantum programming language, such as the Quil programming language. The researcher transmits the code to the quantum cloud system 130 via the network 120.

The quantum cloud system 130 receives the code and the classical processing system 300 generates a set of algorithm instructions, including both classical instructions and quantum instructions, based on the code. The classical processing system 300 then schedules the algorithm instructions such that the result of the code can be determined. For example, the classical processing system 300 schedules the classical operations on the classical processing system 300, some of the quantum instructions on the quantum virtual machine module 700, and the remainder of the quantum instructions on the quantum processing system 200. In this example, the quantum processing system 200 executes the quantum instructions and stores the result in the shared memory 140.

In aggregate, the algorithm instructions executed across the systems and modules of the quantum cloud system 130 determine a result to the protein folding code. Once determined, the quantum cloud system 130 transmits the result to the client device 110 via the network 120.

Figure 2:
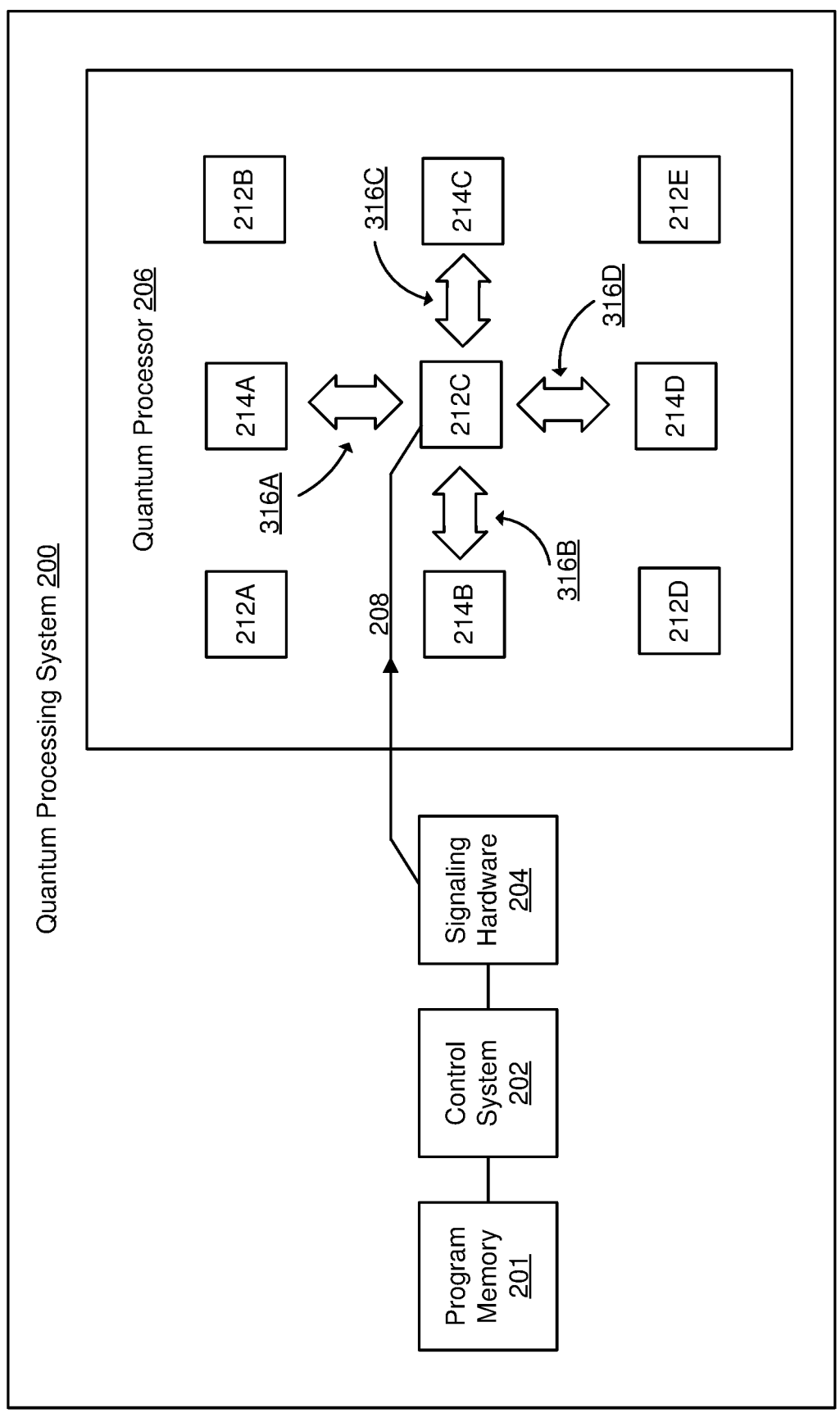
FIG. 2 is a block diagram showing devices and interactions in an example quantum processing system, according to one embodiment.

FIG. 2 is a block diagram showing devices and interactions in an example quantum processing system 200 of the quantum cloud system 130. As shown in FIG. 2, the example quantum processing system 200 includes a program memory 201, a control system 202, signaling hardware 204, and a quantum processor 206. The quantum processing system 200 may include additional or different features, and the components may be arranged differently from the arrangement described herein.

The example quantum processor 206 includes a qubit device array, which includes qubit devices arranged in a two-dimensional or three-dimensional lattice structure (or any other manner of interconnected structure). Nine of the devices in the qubit device array are shown in FIG. 2. In particular, FIG. 2 shows five tunable qubit devices 212 and four other qubit devices 214. In some examples, the tunable qubit devices are implemented as tunable transmon qubit devices, flux qubit devices, flatsonium qubit devices, fluxonium qubit devices, or other types of tunable devices. In some examples, the other qubit devices 214 are also implemented as tunable qubit devices. In some examples, the other qubit devices 214 are implemented as fixed-frequency qubit devices. For instance, other qubit devices 214 may be implemented as fixed-frequency transmon devices or other types of fixed-frequency qubit devices. The devices shown in FIG. 2 may be implemented by other types of devices or components. As an example, one or more of the qubit devices shown in FIG. 2 may be implemented as a resonator device, a coupler device, or otherwise.

In some instances, all or part of the quantum processor 206 functions as a quantum processor, a quantum memory, or another type of subsystem. In some examples, the quantum processor 206 includes a quantum circuit system. The quantum circuit system may include qubit devices, resonator devices and possibly other devices that are used to store and process quantum information. In some cases, the quantum processor 206 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor 206. In some cases, the quantum processor 206 includes an ion trap system, and the qubit devices are implemented as trapped ions controlled by optical signals delivered to the quantum processor 206. In some cases, the quantum processor 206 includes a spin system, and the qubit devices are implemented as nuclear or electron spins controlled by microwave or radio-frequency signals delivered to the quantum processor 206. The quantum processor 206 may be implemented based on another physical modality of quantum computing.

In the example shown in FIG. 2, the devices are arranged in a rectilinear (e.g., rectangular or square) array that extends in two spatial dimensions, and each qubit device has up to four nearest-neighbor qubit devices. In some implementations, the devices can be arranged in another type of ordered or unordered array (e.g., a hexagonal lattice, a ring, etc.). In some instances, the rectilinear array also extends in a third spatial dimension to form a cubic array or another type of three-dimensional array. In some embodiments, a third dimension may also be used for signal delivery, or to enable interaction of distant qubits through an extra layer of signal delivery. The quantum processor 206 may include additional devices, including additional qubit devices, readout resonators, on chip parametric amplifiers, any type of interconnects, superconducting vias, etc.

The program memory 201 stores program instructions that can be accessed by the control system 202. In particular, the proximity of the program memory 201 ensures that program instructions can be retrieved quickly by the control system 202. The program memory may be stored on an application specific integrated circuit (ASIC), a field programmable gate array (FPGA), or another processing unit capable of storing program instructions in memory. In some embodiments, the program memory 201 may be stored on an integrated circuit (IC) of the control system 202, on the same board as the control system 202, or on a machine on the same rack as the control system 202. To be within close proximity of the control system 202, the program memory 201 may be located close enough to the control system 202 that the time required for a signal to travel from the program memory 201 to the control system 202 is less than or equal to the gate time (or a small multiple of the gate time) of the quantum processor 206 (where the gate time is the time taken to execute a gate in the control system 202). For example, in typical embodiments, the gate execution time for a gate on a superconducting circuit quantum processor is between 150 ns and 250 ns, so to be in close proximity to the control system 202, the program memory 201 might be no farther than 45 m, the distance light can travel in a vacuum in 150 ns. In some embodiments with a slower signal speed than the speed of light, the system may include an electrical or optical communication path between the program memory 201 and the control system 202 that is shorter than 13.5 meters and in some embodiments shorter than 4.5 meters. In some embodiments, the program memory 201 may share the memory component which may have additional functionalities. For example, a portion of available FPGA logic may be reserved for instruction memory.

The control system 202 interfaces with the quantum processor 206 via a signal system that includes signal generation and connection hardware elements, e.g. signaling hardware 204. For example, the signaling hardware 204 elements can include signal lines, signal processing hardware, filters, feedthrough devices (e.g., light-tight feedthroughs, etc.), and other types of components. In some embodiments, the control system 202 also communicates with the classical processing system 300 to request quantum instructions that the control system 202 anticipates may be required for future calculations. Such anticipatory instruction requests are sometimes referred to as "pre-fetches." The pre-fetching functionality of the control system 202 is discussed further in the description of FIG. 4.

In some implementations, the signaling hardware 204 can span multiple different temperature and noise regimes. For example, the signaling hardware 204 can include a series of temperature stages (e.g., 60 K, 3 K, 350 mK, 300 mK, 5 mK) that decrease between a higher temperature regime of the control system 202 and a lower temperature regime of the quantum processor 206. The quantum processor 206, and in some cases all or part of the signaling hardware 204, can be maintained in a controlled cryogenic environment. In some examples, the cryogenic environment can be provided, by shielding equipment, cryogenic equipment, and other types of environmental control systems.

The example control system 202 shown in FIG. 2 includes a signal generator system, a program interface, a signal processor system and possibly other components. In some instances, components of the control system 202 can operate in a room temperature regime, an intermediate temperature regime, or both. For example, the control system 202 can be configured to operate at much higher temperatures than are present in the environment of the quantum processor 206.

In some implementations, the tunable qubit devices 212 are housed between neighboring pairs of the other qubit devices 214 in a device array within the quantum processor 206. The quantum states of the respective qubit devices can be manipulated by control signals or read by readout signals generated by the control system 202 and signaling hardware 204. The qubit devices can be controlled individually, for example, by delivering control signals 208 to the respective qubit devices. In some cases, a neighboring pair of qubit devices (e.g., tunable qubit device 212C and other qubit device 214A) is controlled jointly by delivering control signals 208 to the tunable qubit device 212. In some cases, readout devices can detect the states of the qubit devices, for example, by interacting directly with the respective qubit devices.

In the example shown in FIG. 2, each tunable qubit device 212 has one or more tunable transition frequencies. The transition frequency is the energy level between any two adjacent energy levels in a qubit device. The transition frequency of a qubit device is tunable, for example, by application of an offset field. In particular, the transition frequencies of the tunable qubit devices 212 can be tuned by applying an offset field to the tunable qubit device 212. The offset field can be, for example, a magnetic flux bias, a DC electrical voltage, AC electrical voltage or another type of field. In some implementations, the tunability of the tunable qubit devices 212 in the quantum processor 206 allows neighboring pairs of qubits to be selectively coupled on-demand to perform multi-qubit gates, to entangle neighboring pairs of qubits, or to perform other types of operations. The tunable qubit devices 212 can have a high "on/off" ratio, which refers to the ratio of the effective coupling rate provided by control of the tunable qubit device 212. In one embodiment, each tunable qubit device 212 can include a superconducting circuit loop including two Josephson junctions and a capacitor structure in parallel with the junctions.

In some implementations, the other qubit devices 214 are implemented as fixed frequency qubit devices. In one embodiment, a fixed frequency qubit device includes a Josephson junction connected in parallel with a capacitor structure. In this example, the transition frequency of a fixed-frequency qubit device is based in part on the Josephson energy of the junction. In some implementations, the coupling of a fixed-frequency qubit device with neighboring fixed-frequency qubit devices allows multi-qubit gate operations to be performed. In this implementation, the frequency of the qubit is not tunable with an offset field, and the qubit devices are less sensitive to low frequency flux noise, yielding improved longer coherence times.

Figure 3:
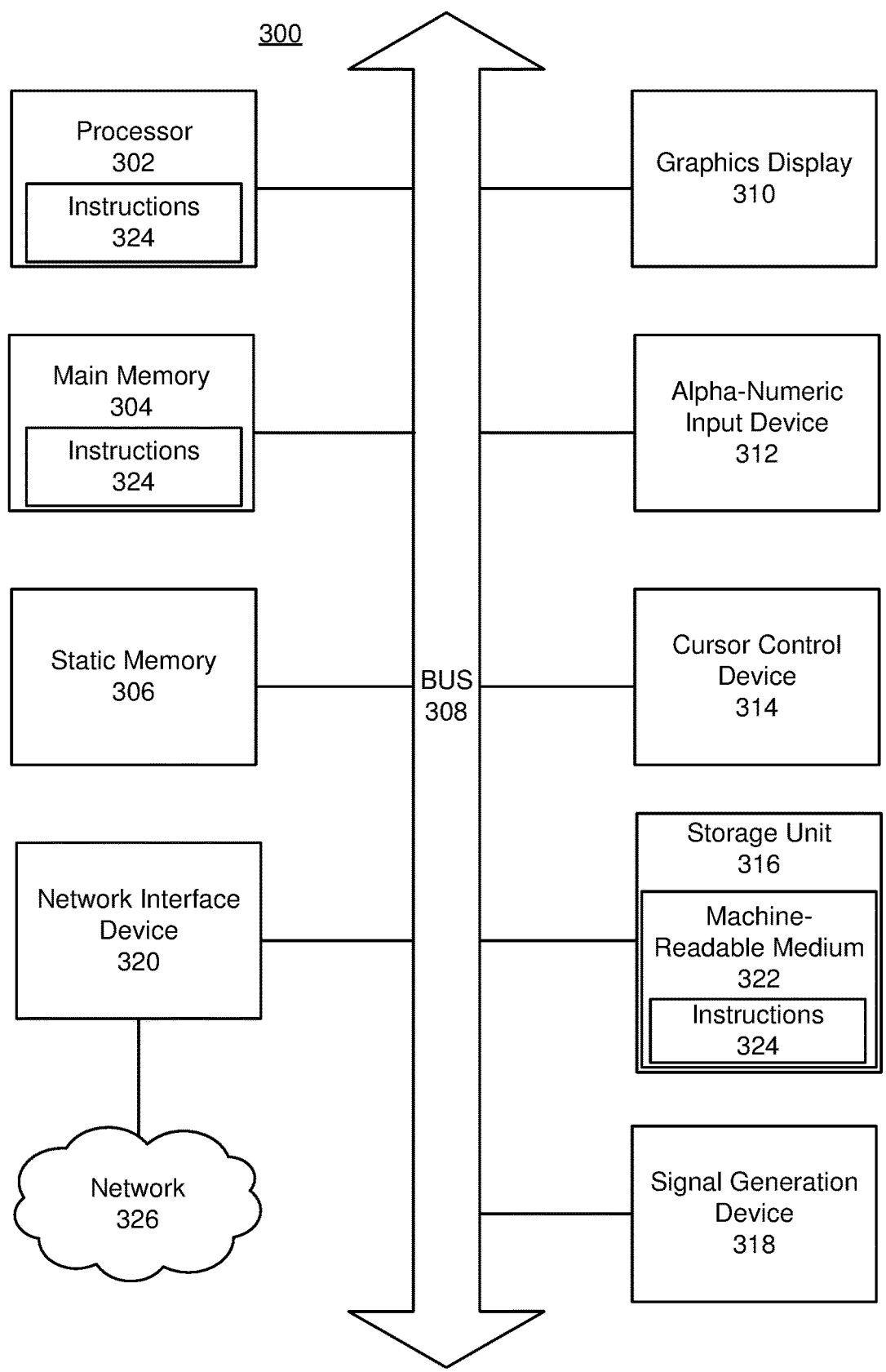
FIG. 3 is a block diagram illustrating components of a classical processing system, according to one embodiment.

FIG. 3 is a block diagram illustrating components of an example classical processing system 300 that facilitates determining the result of a quantum algorithm in the quantum cloud system 130 of FIG. 1. Additionally, the classical processing system 300 is capable of reading and executing instructions from a machine-readable medium.

As an example, FIG. 3 shows a diagrammatic representation of the classical processing system 300 of FIG. 1. The classical processing system 300 can generate quantum algorithm instructions and classical algorithm instructions using the classical processors 302. Further, the classical processing system 300 can be used to execute the classical instructions 324 of the algorithm instructions. In alternative embodiments, the classical processing system 300 operates as a standalone device or a connected (e.g., networked) device that connects to the network system. In the illustrated embodiment, the classical processing system 300 may be a server computer, capable of executing the classical instructions 324 (sequential or otherwise) that specify actions to be taken by the classical processing system 300 to determine the result of the quantum algorithm.

The example classical processing system 300 includes one or more processing units (hereinafter referred to as processor 302). The processor 302 is, for example, a central processing unit (CPU), a graphics processing unit (GPU), a digital signal processor (DSP), a controller, a state machine, one or more application specific integrated circuits (ASICs), a field programmable gate array (FPGA), one or more radio-frequency integrated circuits (RFICs), or any combination of these. The processors 302 can generate control information, for example, based on the determined algorithm instructions (e.g., a set of quantum gates, offset field signals, quantum simulation parameters, etc.) to be performed by the quantum processing system 200, or quantum virtual machine module 700.

The classical processing system 300 also includes a main memory 304. The computer system may include a storage unit 316. The processor 302, memory 304, and the storage unit 316 communicate via a bus 308. In addition, the computer processing system 300 can include a static memory 306.

Additionally, the classical processing system 300 includes a storage unit 316. The storage unit 316 includes a machine-readable medium 322 on which the classical instructions 324 embodying any one or more of the methodologies or functions described herein can be stored. For example, the classical instructions 324 may include the functionalities of modules and systems of the quantum cloud system 130 described in FIG. 1. The classical instructions 324 may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 may be transmitted or received over a network 326 via the network interface device 320.

In various embodiments, the memory systems can include, for example, a random access memory (RAM), a storage device (e.g., a writable read-only memory (ROM) or others), a hard disk, or another type of storage medium. The memory can include various forms of memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks.

The classical processing system 300 may also include a graphics display 310 (e.g., to drive a plasma display panel (PDP), a liquid crystal display (LCD), or a projector), alphanumeric input device 312 (e.g., a keyboard), a cursor control device 314 (e.g., a mouse, a trackball, a joystick, a motion sensor, or other pointing instrument), and a network interface device 320, which also are configured to communicate via the bus 308.

The classical processing system includes a signal generation device 318. The signal generation device can include, radio frequency (RF) or microwave (µW) generators, radio frequency (RF) or microwave (µW) receivers, DC sources, or other type of radio frequency (RF) or microwave (µW) devices.

In these implementations, radio frequency (RF) or microwave (µW) generators and DC sources of the signal generation devices 318, can each generate control signals based on control information provided by the processors 302. The control signals can be delivered to the quantum processing system 200 by the signal generation devices 318, for example, and interact with circuit devices in the quantum processor 206. In some implementations, radio frequency (RF) or microwave (µW) receivers in the signaling hardware 318 can receive and process signals from the quantum processor 206. For example, receivers in the signaling hardware 318 can include a digitizer, a microwave source, and other types of signal processing components. In some embodiments, the receivers of the signaling hardware 318 can process (e.g., digitize, or otherwise process) the signals from the quantum processor 206 and provide the processed information to the processors 302. The processors 302 can extract data to identify the quantum states of qubits in the quantum processor 206 or for other purposes.

While machine-readable medium 322 is shown in an example embodiment to be a single medium, the term "machine-readable medium" should be taken to include a single medium or multiple media (e.g., a centralized or distributed database, or associated caches and servers) able to store the instructions 324. The term "machine-readable medium" shall also be taken to include any medium that is capable of storing instructions 324 for execution by the machine and that cause the machine to perform any one or more of the methodologies disclosed herein. The term "machine-readable medium" includes, but not be limited to, data repositories in the form of solid-state memories, optical media, and magnetic media.

In some instances, the classical processing system 300 operates based on a clock cycle or another type of synchronization scheme. For example, the synchronization scheme can be based on a quantum algorithm or quantum processing task. The quantum algorithm or quantum processing task may be expressed as a sequence of instructions corresponding to quantum gates, readouts, or other operations on the qubit devices, and a subset of the instructions can be executed on each clock cycle, over an interval of time corresponding to the subset of the instructions, in response to the completion of the execution of one or more previous instructions, or in response to any other suitable triggering condition. In some instances, on each clock cycle, the classical processing system 300 generates control signals to implement a subset of instructions, control signals are delivered to the quantum processing system 200, and qubit readout signals are delivered to the classical processing system 300. The control signals delivered on each clock cycle can be configured, for example, based on the sequence of instructions, based on readout signals from a previous cycle, quantum error correction operations, error matching calculations, other information, or a combination of these.

In some embodiments, client devices 110 may be similarly configured to the classical processing system 300. That is, the client devices 110 can include any elements of the classical processing system 300, or any additional element, such that the client devices 110 are able to send quantum algorithms or instructions to the quantum cloud system 130 and receive the results of quantum algorithms in response.

Figure 4:
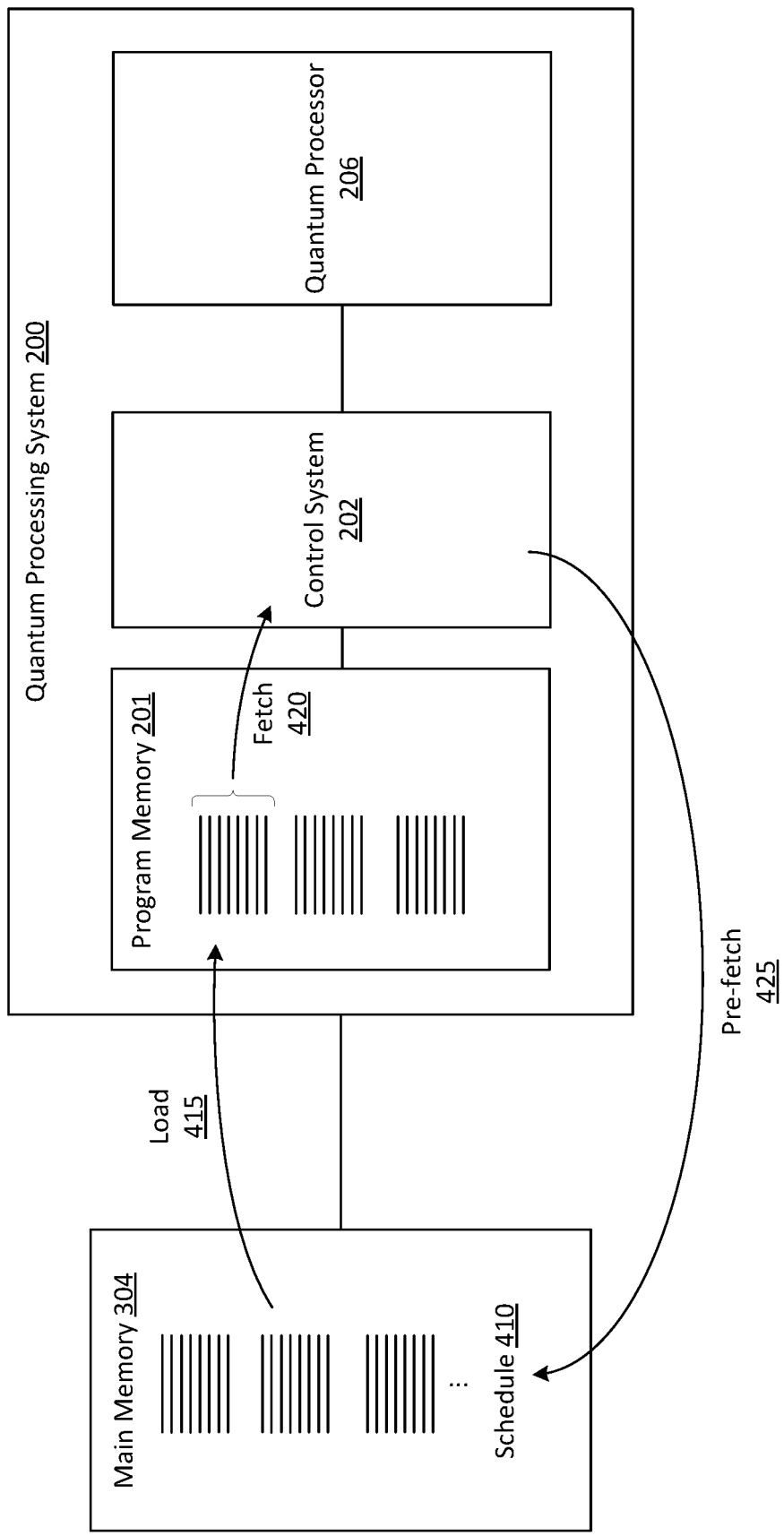
FIG. 4 is a high-level block diagram illustrating instruction transfers and other interactions between the classical processing system and the quantum processing system, according to one embodiment.

FIG. 4 is a high-level block diagram illustrating instruction transfers and other interactions between the classical processing system 300 and the quantum processing system 200, according to one embodiment. The classical processing system 300 compiles quantum programs into a schedule 410. As described previously, a compiled quantum program may include instructions for simultaneous execution. For example, a schedule 410 may include blocks of quantum instructions (e.g., compiled from Quil) such that all instructions in a block may be executed at the same time. Thus, the schedule 410 in FIG. 4 may be thought of as a compiled quantum program that can include specified times at which blocks of instructions should run on a quantum processor 206. In some cases, times at which blocks of instructions should run on a quantum processor 206 may be implicitly rather than explicitly included in the schedule 410. For example, the times at which blocks of instructions should run may be based on a number of clock cycles. In some embodiments, the schedule 410 may be compiled by a client device 110, rather than by the classical processing system 300.

The compiled schedule 410 is stored in a memory storage location on the quantum cloud system 130. As depicted in FIG. 4, the schedule 410 may be stored in main memory 304 of the classical processing system 300. In other embodiments, the schedule may be stored in alternative locations, such as static memory 306, storage unit 316, or shared memory 140. As described previously, it can take too long for a quantum processing system 200 to retrieve instructions from main memory 304 on the classical processing system 300. Rather than accessing instructions at the time they are needed, the quantum processing system 200 loads 415 a subset of the instructions in the schedule 410 from main memory 304 into program memory 201. In one embodiment, a subset of the schedule 410 retrieved from main memory 304 is in the form of one or more execution blocks of quantum instructions.

The control system 202 fetches 420 a next block of instructions for execution when the quantum processor 206 is available to perform a next computation. The control system 202 configures the quantum processor 206 to perform the instructions in the block of instructions, for example, using signaling hardware 204. The quantum processor 206 performs the operations that are included within the instruction block. The control system 202 continues fetching 420 instruction blocks from program memory 201, and configuring the quantum processing system 200 to perform the operations. Thus, the program memory 201 facilitates a scheme for streaming machine code from the classical processing system 300 to the quantum processor 206 as quantum instructions are being executed by the quantum processor 206.

In addition to fetching blocks of instructions from program memory 201, the control system 202 anticipates instructions coming from main memory 304 and pre-fetches 425 instructions from the schedule 410 in main memory 304. In one embodiment, the control system 202 anticipates loops, jumps, and branches because they are marked within or in association with instructions in the compiled schedule 410. The control system 202 anticipates operations that are queued for subsequent execution and alerts main memory 304 to load the needed instructions into the program memory 201 when space becomes available. For example, where branching points are included in a series of quantum instructions, the control stream may request that the main memory 304 load instructions from a branch the program is likely to take. In this way, the control system 202 helps to ensure that the instructions that are needed for execution by the quantum processor 206 are in the program memory 201 already at the time of execution. In some embodiments, the classical processing system 300 may manage decisions about which instructions to pre-fetch 425, instead of the control system 202.

Figure 5B:
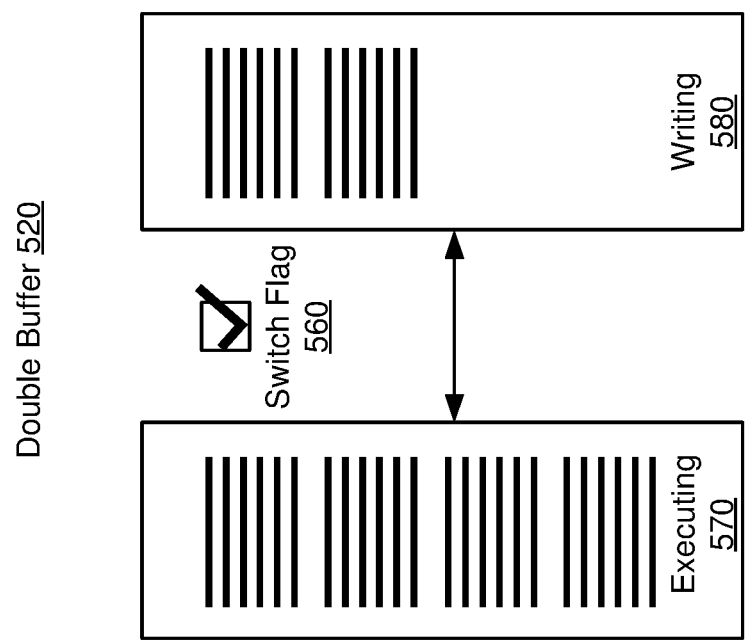
FIG. 5B is an illustration of a double buffer data structure, according to one example embodiment.
Figure 5A:
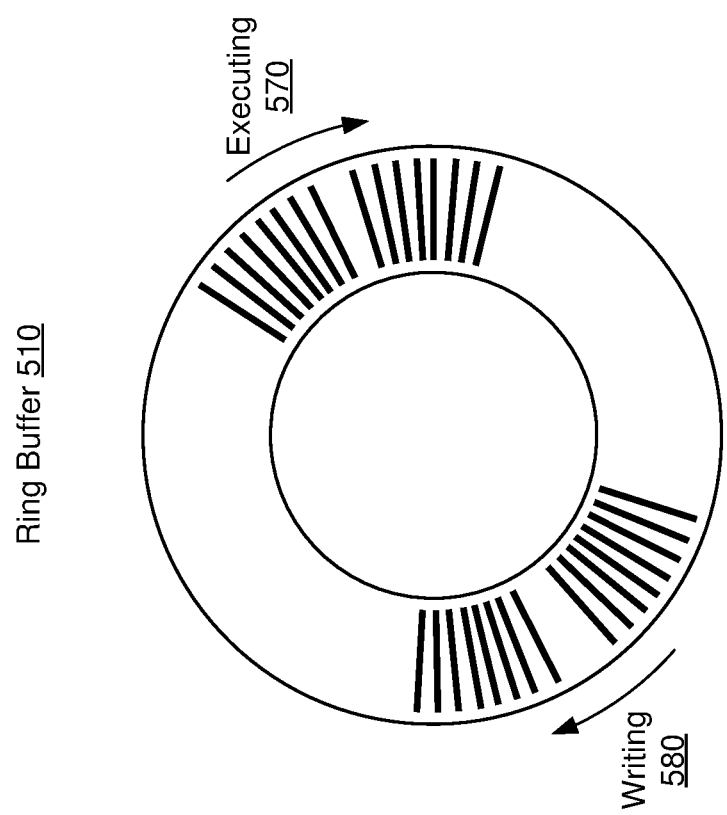
FIG. 5A is an illustration of a ring buffer data structure, according to one example embodiment.

The program memory 201 may be formatted in various ways. FIG. 5A and FIG. 5B show two possible data structures that can support the simultaneous reading and writing of data at the program memory 201. Such data structures may be implemented in software or may be implemented directly in hardware. FIG. 5A is an illustration of a ring buffer 510 data structure, according to one example embodiment. A ring buffer 510 may be implemented when instructions from a schedule 410 are written into program memory 201 as the control system 202 pulls previously written 580 instructions from the program memory 201 for execution 570 by the quantum processor 206. In a ring buffer 510 data structure, it is necessary to keep a gap between the address in the logical ring at which instructions are being written 580 and the address at which instructions are being pulled for execution 570. In other words, execution 570 must come after the new instructions have been written 580 to the ring buffer data structure 510 over previously executed instructions.

FIG. 5B is an illustration of a double buffer 520 data structure, according to one example embodiment. Like a ring buffer 510, the double buffer 520 allows instructions to be written 580 to program memory 201 and executed 570 simultaneously. In the double buffer 520 approach, the program memory 201 is divided into two sections. While the control system 202 fetches instructions from a first memory section for execution 570 by the quantum processor 206, the main memory 304 writes 580 scheduled instructions to the second memory section. When all of the instructions in the first memory section have been pulled by the control system 202 for execution, the roles of the two memory sections switch. That is, the main memory 304 begins writing 580 instructions over the previously executed instructions, and the control system 202 pulls instructions from the memory section to which instructions were previously being written. In some embodiments, a switch flag 560, other Boolean operator, or another scheme may be used to indicate which memory section is currently being used for writing 580 and which memory section is currently being used for program execution 570. Other embodiments may employ the same approach of swapping among writing and execution buffers using any number of buffers, such as a triple buffer format, or a quadruple buffer format.

Loading instructions into program memory 201 while the control system 202 simultaneously fetches instructions from program memory 201 for execution on the quantum processor 206 is a fundamentally new way of interacting with a quantum machine. For example, this arrangement facilitates quantum computation of programs using just-in-time (JIT) compilation, that is, compilation of a program at run-time, rather than prior to program execution. In this case, instruction blocks in a schedule do not need to be compiled until just before they are loaded into program memory 201. This can be useful, for example, when a remote user interacts with the quantum cloud system 130 via a client device 110.

This system beneficially increases the effective size of the memory available to the quantum processor 206 without increasing the latency of reading instructions from memory. Quantum processors 206 tend to need a large amount of memory since they can execute many instructions simultaneously (all of which require memory space). The program memory 201 provides a staging area for instructions that are about to execute on the quantum processor 206, and thus the quantum processing system 200 is able to operate much faster than it does when it has to wait for new instructions to be fetched directly from main memory 304 (or elsewhere) on a classical processing system 300.

Although the detailed description contains many specifics, these should not be construed as limiting the scope of the invention but merely as illustrating different examples and aspects of the invention. It should be appreciated that the scope of the invention includes other embodiments not discussed in detail above. For example, although quantum program instructions are shown herein as coming from main memory 304, the program instructions may originate from any memory store on the quantum cloud system 130. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A classical/quantum hybrid processing system architecture, comprising:
    a field programmable gate array (FPGA), at least a portion of the FPGA configured as a shared memory having a first storage capacity;
    a quantum processing unit (QPU) communicatively coupled to the FPGA and comprising:
        an input configured to access a set of quantum instructions stored within the shared memory of the FPGA;
        a plurality of qubits;
        a controller configured to:
            configure the plurality of qubits based on the accessed set of quantum instructions; and
            identify a branch instruction within the accessed set of quantum instructions, the branch instruction including a corresponding branch instruction address; and
        an output configured to:
            output computed results from the plurality of qubits;
            output an indication that the accessed set of quantum instructions has been executed; and
            in response to the controller identifying a branch instruction, output the corresponding branch instruction address; and
    a classical processing system communicatively coupled to the FPGA and the QPU comprising:
        an input configured to receive branch instruction addresses and indications that an accessed set of quantum instructions has been executed from the QPU;
        an output configured to write selected sets of quantum instructions to the shared memory portion of the FPGA; and a central processing unit (CPU) configured to:
compile a program for execution by the quantum processing system, the compiled program comprising multiple sets of quantum instructions, the sets of quantum instructions collectively requiring a second storage capacity greater than the first storage capacity;
selecting one or more initial sets of quantum instructions for writing to the shared memory portion of the FPGA;
in response to receiving the indication that the accessed set of quantum instructions has been executed, selecting one or more additional sets of quantum instructions for writing to the shared memory portion of the FPGA; and
in response to receiving a branch instruction address, selecting one or more branched sets of quantum instructions corresponding to the branch instruction address for writing to the FPGA.

2. A method of scheduling instructions in a classical-quantum hybrid computing system comprising:
receiving, at a memory of a quantum processing system from a classical processing system, a first set of instructions corresponding to a compiled quantum program;
executing, by the quantum processing system, the first set of instructions;
concurrent to executing the first set of instructions, receiving at the memory of the quantum processing system from the classical processing system, a second set of instructions corresponding to the compiled quantum program;
in response to identifying, by the quantum processing system, a branch instruction stored by the memory of the quantum processing system:
identifying, by the quantum processing system, a branch address corresponding to the branch instruction;
requesting, by the quantum processing system, a third set of instructions corresponding to the branch address; and
receiving, at the memory of the quantum processing system from the classical processing system, the third set of instructions.

3. The method of claim 2, wherein a set of instructions corresponding to the compiled quantum program includes quantum instructions grouped such that the instructions in a group are scheduled for simultaneous execution on the quantum processing system.

4. The method of claim 2, wherein the memory of the quantum processing system comprises one of: a field programmable gate array (FPGA), or an application-specific integrated circuit (ASIC).

5. The method of claim 2, wherein executing the first set of instructions on the quantum processing system comprises executing all instructions in the first set of quantum instructions simultaneously.

6. The method of claim 2, wherein receiving the third set of instructions comprises overwriting instructions in the memory of the quantum processing system that have already been accessed and executed by the quantum processor.

7. The method of claim 2, wherein the memory of the quantum processing system is configured in one of: a ring buffer format or a double buffer format.

8. The method of claim 2, wherein a subset of the instructions corresponding to a compiled quantum program are executed by a quantum virtual machine.

9. The method of claim 2, wherein the compiled quantum program was compiled from a quantum machine instruction language.

10. The method of claim 2, wherein a branch instruction includes one of a loop or jump indicated in the compiled quantum program.

11. A quantum cloud system comprising:
an input configured to receive instructions corresponding to a compiled quantum program via a network;
a first memory configured to store received quantum program instructions according to an instruction schedule;
one or more classical processing system processors configured to execute classical program instructions stored by the first memory;
one or more quantum processing system processors configured to execute quantum program instructions stored by the first memory; and
a controller configured to:
identify a next set of instructions stored by the first memory based on the instruction schedule;
allocate quantum instructions within the next set of instructions to a second memory for intermediate storage;
allocate the quantum instructions stored at the second memory to the one or more quantum processing system processors for execution; and
request additional quantum instructions corresponding to the compiled quantum program from the first memory; and
an output configured to output a result of executing the quantum program instructions stored by the first memory.

12. The quantum cloud system of claim 11, wherein the additional quantum instructions corresponding to the compiled quantum program include instructions corresponding to a branch address in response to identifying a branch instruction stored by the second memory.

13. The quantum cloud system of claim 11, wherein a set of quantum program instructions includes instructions grouped such that the instructions are scheduled for simultaneous execution on the one or more quantum processors.

14. The quantum cloud system of claim 11, wherein the second memory comprises one of: a field programmable gate array (FPGA), or an application-specific integrated circuit (ASIC).

15. The quantum cloud system of claim 11, wherein the controller is further configured to allocate quantum instructions within the next set of instructions to a second memory such that the next set of instructions overwrite previously executed instructions also stored in the second memory.

16. The quantum cloud system of claim 11, wherein the second memory is configured in one of: a ring buffer format or a double buffer format.

17. The quantum cloud system of claim 11, further comprising one or more classical processing system processors configured as a quantum virtual machine to execute quantum program instructions.

18. The quantum cloud system of claim 11, wherein the first memory is larger than the second memory.

19. The quantum cloud system of claim 11, wherein the controller is configured to:
allocate quantum instructions within the next set of instructions to a second memory for intermediate storage; and allocate the quantum instructions stored at the second memory to the one or more quantum processing system processors for execution;

such that the allocations occur concurrently.

20. The quantum cloud system of claim 11, wherein the second memory is physically closer to the one or more quantum processors than the first memory.

21. The quantum cloud system of claim 11, wherein the controller is configured to communicate with the second memory via one of an electrical or optical communication path, wherein the length of the electrical or optical communication path is less than 4.5 meters.

* * * * *